(12) United States Patent
Sebes et al.

(10) Patent No.: US 8,555,404 B1
(45) Date of Patent: Oct. 8, 2013

(54) CONNECTIVITY-BASED AUTHORIZATION

(75) Inventors: E. John Sebes, Menlo Park, CA (US);
Rishi Bhargava, San Jose, CA (US);
David P. Reese, Belmont, CA (US)

(73) Assignee: McAfee, Inc., Santa Clara, CA (US)

( * ) Notice: Subject to any disclaimer, the term of this patent is extended or adjusted under 35 U.S.C. 154(b) by 1395 days.

(21) Appl. No.: 11/437,317

(22) Filed: May 18, 2006

(51) Int. Cl.
*G06F 7/04* (2006.01)
(52) U.S. Cl.
USPC .......................................................... 726/27
(58) Field of Classification Search
USPC .......................................................... 726/27
See application file for complete search history.

(56) References Cited

U.S. PATENT DOCUMENTS

| | | | |
|---|---|---|---|
| 4,688,169 A | 8/1987 | Joshi | 364/200 |
| 4,982,430 A | 1/1991 | Frezza et al. | 380/50 |
| 5,155,847 A | 10/1992 | Kirouac et al. | |
| 5,222,134 A | 6/1993 | Waite et al. | 380/4 |
| 5,390,314 A | 2/1995 | Swanson | 395/500 |
| 5,521,849 A | 5/1996 | Adelson et al. | 364/570 |
| 5,560,008 A | 9/1996 | Johnson et al. | 395/650 |
| 5,699,513 A | 12/1997 | Feigen et al. | 395/187.01 |
| 5,778,226 A | 7/1998 | Adams et al. | |
| 5,778,349 A | 7/1998 | Okonogi | 707/1 |
| 5,787,427 A | 7/1998 | Benantar et al. | |
| 5,842,017 A | 11/1998 | Hookway et al. | 395/707 |
| 5,907,709 A | 5/1999 | Cantey et al. | 395/705 |
| 5,907,860 A | 5/1999 | Garibay et al. | |
| 5,926,832 A | 7/1999 | Wing et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | 713/200 |
| 6,321,267 B1 | 11/2001 | Donaldson | |

(Continued)

FOREIGN PATENT DOCUMENTS

EP 1 482 394 A2 12/2004
EP 2 037 657 A1 3/2009

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner* — Shewaye Gelagay
(74) *Attorney, Agent, or Firm* — Patent Capital Group

(57) ABSTRACT

Techniques which allow definition and enforcement of connectivity-based action and execution authorization policies. On a computer, an action or execution attempt is intercepted in real-time. The connectivity state of the computer, the subject process, the program file of the subject process, the attempted action and the object of the attempted action are determined. An authorization policy considering the connectivity state indicates whether the attempted action is authorized or not. In a tracking mode, the attempted action and its authorization are logged and the attempted action is allowed to proceed. In an enforcement mode, unauthorized attempts are blocked and logged, thereby enforcing the authorization policy.

13 Claims, 3 Drawing Sheets

(56) References Cited

U.S. PATENT DOCUMENTS

| | | | |
|---|---|---|---|
| 6,338,149 B1 | 1/2002 | Ciccone, Jr. et al. | 714/38 |
| 6,356,957 B2 | 3/2002 | Sanchez, II et al. | 709/328 |
| 6,393,465 B2 | 5/2002 | Leeds | 709/207 |
| 6,442,686 B1 | 8/2002 | McArdle et al. | 713/151 |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | 709/224 |
| 6,611,925 B1 | 8/2003 | Spear | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | 717/126 |
| 6,795,966 B1 | 9/2004 | Lim et al. | |
| 6,832,227 B2 | 12/2004 | Seki et al. | 707/101 |
| 6,834,301 B1 | 12/2004 | Hanchett | 709/223 |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | 370/254 |
| 6,934,755 B1 | 8/2005 | Saulpaugh et al. | |
| 6,988,101 B2 | 1/2006 | Ham et al. | 707/10 |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | 719/310 |
| 7,069,330 B1 | 6/2006 | McArdle et al. | |
| 7,082,456 B2 | 7/2006 | Mani-Meitav et al. | 709/203 |
| 7,093,239 B1 | 8/2006 | van der Made | |
| 7,124,409 B2 | 10/2006 | Davis et al. | |
| 7,139,916 B2 | 11/2006 | Billingsley et al. | 713/182 |
| 7,152,148 B2 | 12/2006 | Williams et al. | |
| 7,159,036 B2 | 1/2007 | Hinchliffe et al. | |
| 7,177,267 B2 | 2/2007 | Oliver et al. | 370/216 |
| 7,203,864 B2 | 4/2007 | Goin et al. | |
| 7,251,655 B2 | 7/2007 | Kaler et al. | 707/9 |
| 7,290,266 B2 | 10/2007 | Gladstone et al. | |
| 7,302,558 B2 | 11/2007 | Campbell et al. | 713/1 |
| 7,330,849 B2 | 2/2008 | Gerasoulis et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,363,022 B2 | 4/2008 | Whelan et al. | 455/411 |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,698,744 B2 | 4/2010 | Fanton et al. | |
| 7,703,090 B2 | 4/2010 | Napier et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes | |
| 7,895,573 B1 | 2/2011 | Bhargava et al. | |
| 7,908,653 B2 | 3/2011 | Brickell et al. | |
| 7,937,455 B2 | 5/2011 | Saha et al. | |
| 7,966,659 B1 | 6/2011 | Wilkinson et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,195,931 B1 | 6/2012 | Sharma et al. | |
| 8,234,713 B2 | 7/2012 | Roy-Chowdhury et al. | |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,381,284 B2 | 2/2013 | Dang et al. | |
| 2002/0056076 A1 | 5/2002 | van der Made | |
| 2002/0069367 A1 | 6/2002 | Tindal et al. | |
| 2002/0083175 A1 | 6/2002 | Afek et al. | |
| 2002/0099671 A1 | 7/2002 | Mastin Crosbie et al. | 705/500 |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0073894 A1 | 4/2003 | Chiang et al. | 600/407 |
| 2003/0074552 A1 | 4/2003 | Olkin et al. | 713/150 |
| 2003/0115222 A1 | 6/2003 | Oashi et al. | |
| 2003/0120601 A1 | 6/2003 | Ouye et al. | |
| 2003/0120811 A1 | 6/2003 | Hanson et al. | 709/245 |
| 2003/0120935 A1 | 6/2003 | Teal et al. | 713/188 |
| 2003/0145232 A1 | 7/2003 | Poletto et al. | |
| 2003/0163718 A1 | 8/2003 | Johnson et al. | |
| 2003/0167292 A1 | 9/2003 | Ross | |
| 2003/0167399 A1 | 9/2003 | Audebert et al. | |
| 2003/0200332 A1 | 10/2003 | Gupta et al. | |
| 2003/0212902 A1 | 11/2003 | van der Made | |
| 2003/0220944 A1 | 11/2003 | Schottland et al. | |
| 2003/0221190 A1 | 11/2003 | Deshpande et al. | |
| 2004/0003258 A1 | 1/2004 | Billingsley et al. | |
| 2004/0015554 A1 | 1/2004 | Wilson | 709/206 |
| 2004/0051736 A1 | 3/2004 | Daniell | 345/752 |
| 2004/0054928 A1 | 3/2004 | Hall | |
| 2004/0143749 A1 | 7/2004 | Tajalli et al. | |
| 2004/0167906 A1 | 8/2004 | Smith et al. | |
| 2004/0230963 A1 | 11/2004 | Rothman et al. | 717/168 |
| 2004/0243678 A1 | 12/2004 | Smith et al. | |
| 2004/0255161 A1 | 12/2004 | Cavanaugh | 713/201 |
| 2005/0018651 A1 | 1/2005 | Yan et al. | 370/352 |
| 2005/0086047 A1 | 4/2005 | Uchimoto et al. | |
| 2005/0108516 A1 | 5/2005 | Balzer et al. | |
| 2005/0108562 A1 | 5/2005 | Khazan et al. | |
| 2005/0114672 A1* | 5/2005 | Duncan et al. | 713/182 |
| 2005/0132346 A1 | 6/2005 | Tsantilis | |
| 2005/0228990 A1 | 10/2005 | Kato et al. | 713/167 |
| 2005/0235360 A1* | 10/2005 | Pearson | 726/23 |
| 2005/0257207 A1 | 11/2005 | Blumfield et al. | |
| 2005/0257265 A1 | 11/2005 | Cook et al. | |
| 2005/0260996 A1 | 11/2005 | Groenendaal | |
| 2005/0262558 A1 | 11/2005 | Usov | |
| 2005/0273858 A1 | 12/2005 | Zadok et al. | |
| 2005/0283823 A1 | 12/2005 | Okajo et al. | |
| 2005/0289538 A1 | 12/2005 | Black-Ziegelbein et al. | |
| 2006/0004875 A1 | 1/2006 | Baron et al. | |
| 2006/0015501 A1* | 1/2006 | Sanamrad et al. | 707/9 |
| 2006/0037066 A1 | 2/2006 | Saha et al. | |
| 2006/0080656 A1 | 4/2006 | Cain et al. | |
| 2006/0085785 A1 | 4/2006 | Garrett | |
| 2006/0101277 A1 | 5/2006 | Meenan et al. | |
| 2006/0133223 A1 | 6/2006 | Nakamura et al. | |
| 2006/0136910 A1 | 6/2006 | Brickell et al. | |
| 2006/0136911 A1 | 6/2006 | Robinson et al. | |
| 2006/0195906 A1 | 8/2006 | Jin et al. | |
| 2006/0200863 A1 | 9/2006 | Ray et al. | |
| 2006/0230314 A1 | 10/2006 | Sanjar et al. | |
| 2006/0236398 A1 | 10/2006 | Trakic et al. | |
| 2006/0259734 A1 | 11/2006 | Sheu et al. | |
| 2007/0011746 A1 | 1/2007 | Malpani et al. | |
| 2007/0028303 A1 | 2/2007 | Brennan | |
| 2007/0039049 A1 | 2/2007 | Kupferman et al. | |
| 2007/0050579 A1 | 3/2007 | Hall et al. | |
| 2007/0050764 A1 | 3/2007 | Traut | |
| 2007/0074199 A1 | 3/2007 | Schoenberg | |

(56) References Cited

U.S. PATENT DOCUMENTS

| | | | |
|---|---|---|---|
| 2007/0083522 A1* | 4/2007 | Nord et al. | 707/10 |
| 2007/0101435 A1* | 5/2007 | Konanka et al. | 726/27 |
| 2007/0136579 A1 | 6/2007 | Levy et al. | |
| 2007/0143851 A1 | 6/2007 | Nicodemus et al. | |
| 2007/0169079 A1 | 7/2007 | Keller et al. | |
| 2007/0192329 A1 | 8/2007 | Croft et al. | |
| 2007/0220061 A1 | 9/2007 | Tirosh et al. | |
| 2007/0220507 A1 | 9/2007 | Back et al. | |
| 2007/0253430 A1 | 11/2007 | Minami et al. | |
| 2007/0256138 A1 | 11/2007 | Gadea et al. | |
| 2007/0271561 A1 | 11/2007 | Winner et al. | |
| 2007/0300215 A1 | 12/2007 | Bardsley | |
| 2008/0005737 A1 | 1/2008 | Saha et al. | |
| 2008/0005798 A1 | 1/2008 | Ross | |
| 2008/0010304 A1 | 1/2008 | Vempala et al. | |
| 2008/0022384 A1 | 1/2008 | Yee et al. | |
| 2008/0034416 A1 | 2/2008 | Kumar et al. | |
| 2008/0052468 A1 | 2/2008 | Speirs et al. | |
| 2008/0082977 A1 | 4/2008 | Araujo et al. | |
| 2008/0120499 A1 | 5/2008 | Zimmer et al. | |
| 2008/0141371 A1 | 6/2008 | Bradicich et al. | |
| 2008/0163207 A1 | 7/2008 | Reumann et al. | |
| 2008/0163210 A1 | 7/2008 | Bowman et al. | |
| 2008/0165952 A1 | 7/2008 | Smith et al. | |
| 2008/0184373 A1 | 7/2008 | Traut et al. | |
| 2008/0235534 A1 | 9/2008 | Matthias et al. | |
| 2008/0294703 A1 | 11/2008 | Craft et al. | |
| 2008/0301770 A1 | 12/2008 | Kinder | |
| 2009/0007100 A1 | 1/2009 | Field et al. | |
| 2009/0038017 A1 | 2/2009 | Durham et al. | |
| 2009/0043993 A1 | 2/2009 | Ford et al. | |
| 2009/0055693 A1 | 2/2009 | Budko et al. | |
| 2009/0113110 A1 | 4/2009 | Xiaoxin et al. | |
| 2009/0144300 A1 | 6/2009 | Chatley et al. | |
| 2009/0150639 A1 | 6/2009 | Ohata | |
| 2009/0249053 A1 | 10/2009 | Zimmer et al. | |
| 2009/0249438 A1 | 10/2009 | Litvin et al. | |
| 2010/0071035 A1 | 3/2010 | Budko et al. | |
| 2010/0100970 A1 | 4/2010 | Chowdhury et al. | |
| 2010/0114825 A1 | 5/2010 | Siddegowda | |
| 2010/0250895 A1 | 9/2010 | Adams et al. | |
| 2010/0281133 A1 | 11/2010 | Brendel | |
| 2010/0293225 A1 | 11/2010 | Sebes et al. | |
| 2010/0332910 A1 | 12/2010 | Qasim et al. | |
| 2011/0029772 A1 | 2/2011 | Fanton et al. | |
| 2011/0035423 A1 | 2/2011 | Kobayashi et al. | |
| 2011/0047543 A1 | 2/2011 | Mohinder | |
| 2011/0077948 A1 | 3/2011 | Sharma et al. | |
| 2011/0078550 A1 | 3/2011 | Nabutovsky | |
| 2011/0093842 A1 | 4/2011 | Sebes | |
| 2011/0113467 A1 | 5/2011 | Agarwal et al. | |
| 2011/0119760 A1 | 5/2011 | Sebes et al. | |
| 2011/0138461 A1 | 6/2011 | Bhargava et al. | |
| 2012/0030731 A1 | 2/2012 | Bhargava et al. | |
| 2012/0030750 A1 | 2/2012 | Bhargava et al. | |
| 2012/0278853 A1 | 11/2012 | Chowdhury et al. | |
| 2012/0290827 A1 | 11/2012 | Bhargava et al. | |
| 2012/0297176 A1 | 11/2012 | Bhargava et al. | |
| 2013/0024934 A1 | 1/2013 | Sebes et al. | |
| 2013/0091318 A1 | 4/2013 | Bhattacharjee et al. | |
| 2013/0097355 A1 | 4/2013 | Dang et al. | |
| 2013/0097356 A1 | 4/2013 | Dang et al. | |
| 2013/0117823 A1 | 5/2013 | Dang et al. | |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012-015489 | 2/2012 |

OTHER PUBLICATIONS

U.S. Appl. No. 11/379,953, entitled "Software Modification by Group to Minimize Breakage," filed Apr. 24, 2006, Inventor(s): E. John Sebes et al.

U.S. Appl. No. 11/277,596, entitled "Execution Environment File Inventory," filed Mar. 27, 2006, Inventor(s): Rishi Bhargava et al.

U.S. Appl. No. 10/651,591, entitled "Method and System for Containment of Networked Application Client Software by Explicit Human Input," filed Aug. 29, 2003, Inventor(s): Rosen Sharma et al.

U.S. Appl. No. 10/806,578, entitled Containment of Network communication, filed Mar. 22, 2004, Inventor(s): E. John Sebes et al.

U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.

U.S. Appl. No. 11/060,683, entitled "Distribution and Installation of Solidified Software on a Computer," filed Feb. 16, 2005, Inventor(s): Bakul Shah et al.

U.S. Appl. No. 11/122,872, entitled "Piracy Prevention Using Unique Module Translation," filed May 4, 2005, Inventor(s): E. John Sebes et al.

U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.

U.S. Appl. No. 11/182,320, entitled "Classification of Software on Networked Systems," filed Jul. 14, 2005, Inventor(s): E. John Sebes et al.

U.S. Appl. No. 11/400,085, entitled "Program-Based Authorization," filed Apr. 7, 2006, Inventor(s): Rishi Bhargava et al.

U.S. Appl. No. 12/290,380, entitled "Application Change Control," filed Oct. 29, 2008, Inventor(s): Rosen Sharma et al.

U.S. Appl. No. 12/008,274, entitled Method and Apparatus for Process Enforced Configuration Management, filed Jan. 9, 2008, Inventor(s): Rishi Bhargava et al.

U.S. Appl. No. 12/291,232, entitled "Method of and System for Computer System State Checks," filed Nov. 7, 2008, inventor(s): Rishi Bhargava et al.

U.S. Appl. No. 12/322,220, entitled "Method of and System for Malicious Software Detection Using Critical Address Space Protection," filed Jan. 29, 2009, Inventor(s): Suman Saraf et al.

U.S. Appl. No. 12/322,321, entitled "Method of and System for Computer System Denial-of-Service Protection," filed Jan. 29, 2009, Inventor(s): Suman Saraf et al.

U.S. Appl. No. 12/426,859, entitled "Method of and System for Reverse Mapping Vnode Pointers," filed Apr. 20, 2009, Inventor(s): Suman Saraf et al.

U.S. Appl. No. 12/545,609, entitled "System and Method for Enforcing Security Policies in a Virtual Environment," filed Aug. 21, 2009, Inventor(s): Amit Dang et al.

U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).

U.S. Appl. No. 12/551,673, entitled "Piracy Prevention Using Unique Module Translation," filed Sep. 1, 2009, Inventor(s): E. John Sebes et al.

U.S. Appl. No. 12/615,521, entitled "System and Method for Preventing Data Loss Using Virtual Machine Wrapped Applications," filed Nov. 10, 2009, Inventor(s): Sonali Agarwal, et al.

Desktop Management and Control, Website: http://www.vmware.com/solutions/desktop/, printed Oct. 12, 2009, 1 page.

(56) References Cited

OTHER PUBLICATIONS

Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/839,856, entitled "Containment of Network Communication," filed Jul. 20, 2010, Inventor(s) E. John Sebes, et al.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventor(s) Rishi Bhargava, et al.
U.S. Appl. No. 12/946,081, entitled "Method and System for Containment of Usage of Language Interfaces," filed Nov. 15, Inventor(s) Rosen Sharma, et al.
U.S. Appl. No. 13/022,148, entitled "Execution Environment File Inventory," filed Feb. 7, 2011, Inventor(s) Rishi Bhargava, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 12/975,745, entitled "Program-Based Authorization," filed Dec. 22, 2010, Inventor(s) Rishi Bhargava, et al.
U.S. Appl. No. 12/976,159, entitled "Solidifying the Executable Software Set of a Computer," filed Dec. 22, 2010, Inventor E. John Sebes.
Gaurav et al., "Countering Code-Injection Attacks with Instruction-Set Randomization," Oct. 27-31, 2003, ACM, pp. 272-280.
Barrantes et al., "Randomized Instruction Set Emulation to Dispurt Binary Code Injection Attacks," Oct. 27-31, 2003, ACM, pp. 281-289.
IA-32 Intel® Architecture Software Developer's Manual, vol. 3B; Jun. 2006; pp. 13, 15, 22 and 145-146.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
U.S. Appl. No. 12/944,567, entitled "Classification of Software on Networked Systems," filed Nov. 11, 2010, Inventor(s) E. John Sebes, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,081, entitled "Method and System for Containment of Usage of Language Interfaces," filed Nov. 15, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.Ist.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventor(s) Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.

(56) References Cited

OTHER PUBLICATIONS

Shacham, et al., "On the Effectiveness of Address-Space Randomization," CCS'04, Oct. 25-29, 2004, Washington, D.C., Copyright 2004, 10 pages.

U.S. Appl. No. 13/271,102, filed Oct. 11, 2011, entitled System and Method for Critical Address Space Protection in a Hypervisor Environment, Inventors: Rajbir Bhattacharjee, et al.

International Search Report and Written Opinion mailed Dec. 14, 2012 for International Application No. 04796-1087WO, 9 pages.

U.S. Appl. No. 13/723,445, filed Dec. 21, 2012, entitled "System and Method for Enforcing Security Policies in a Virtual Environment," Inventor(s) Amit Dang, et al.

U.S. Appl. No. 13/629,765, filed Sep. 28, 2012, entitled "Classification of Software on Networked Systems," Inventor(s) E. John Sebes, et al.

International Preliminary Report on Patentability and Written Opinion issued Jan. 29, 2013 for International Application No. PCT/US2011/020677 (9 pages).

International Preliminary Report on Patentability and Written Opinion issued Jan. 29, 2013 for International Application No. PCT/US2011/024869 (6 pages).

International Preliminary Report on Patentability and Written Opinion issued Jan. 29, 2013 for International Application No. PCT/US2011/024869, 6 pages.

Office Action received for U.S. Appl. No. 12/844,892, mailed on Jan. 17, 2013, 29 pages.

Response to Office Action received for U.S. Appl. No. 12/844,892, filed Dec. 6, 2012, 34 pages.

\* cited by examiner

CONNECTIVITY-BASED AUTHORIZATION

CROSS REFERENCE TO RELATED APPLICATIONS

This application is related to the following, all of which are incorporated herein by reference in their entirety:

co-pending U.S. patent application Ser. No. 10/651,591, entitled "Method and System for Containment of Networked Application Client Software by Explicit Human Input" and filed on Aug. 29, 2003;

U.S. Pat. No. 7,464,408, issued on Dec. 9, 2008, from U.S. patent application Ser. No. 10/651,588, entitled "Damage Containment by Translation" and filed on Aug. 29, 2003;

U.S. Pat. No. 7,783,735, issued on Aug. 24, 2010, from U.S. patent application Ser. No. 10/806,578, entitled "Containment of Network Communication" and filed on Mar. 22, 2004;

U.S. Pat. No. 7,840,968, issued on Nov. 23, 2010, from U.S. patent application Ser. No. 10/739,230, entitled "Method and System for Containment of Usage of Language Interfaces" and filed on Dec. 17, 2003;

U.S. Pat. No. 7,873,955, issued on Jan. 18, 2011 from U.S. patent application Ser. No. 10/935,772, entitled "Solidifying the Executable Software Set of a Computer" and filed on Sep. 7, 2004;

U.S. patent application Ser. No. 11/060,683, entitled "Distribution and Installation of Solidified Software on a Computer" and filed on Feb. 16, 2005;

U.S. Pat. No. 7,603,552, issued on Oct. 13, 2009 from U.S. patent application Ser. No. 11/122,872, entitled "Piracy Prevention Using Unique Module Translation" and filed on May 4, 2005;

U.S. Pat. No. 7,856,661, issued on Dec. 21, 2010 from U.S. patent application Ser. No. 11/182,320, entitled "Classification of Software on Networked Systems" and filed on Jul. 14, 2005;

U.S. Pat. No. 7,757,269, issued on Jul. 13, 2010, from U.S. patent application Ser. No. 11/346,741, entitled "Enforcing Alignment of Approved Changes and Deployed Changes in the Software Change Life-Cycle", by Rahul Roy-Chowdhury, E. John Sebes and Jay Vaishnav, filed on Feb. 2, 2006;

U.S. Pat. No. 7,895,573, issued on Feb. 22, 2011 from U.S. patent application Ser. No. 11/277,596, entitled "Execution Environment File Inventory", by Rishi Bhargava and E. John Sebes, filed on Mar. 27, 2006; and U.S. Pat. No. 7,870,387, issued on Jan. 11, 2011, from U.S. patent application Ser. No. 11/400,085, entitled "Program-Based Authorization", by Rishi Bhargava and E. John Sebes, filed on Apr. 7, 2006.

BACKGROUND

1. Field

Invention relates generally to authorization of actions on computer systems, and in particular to authorization based on connectivity states.

2. Related Art

Access control is a useful and practical concept in the field of information technology. The definition, monitoring and enforcement of access control policies contribute to the predictable and manageable operation and maintenance of business assets and processes.

An abstraction central to access control is that of subjects performing actions on objects. Actions, including those attempted by human subjects, are ultimately performed by one or more processes running on the computer. While traditional access control techniques use authorization policies that are generally defined for "human" subjects, and additional techniques that allow program-based authorization are disclosed in above referenced U.S. Pat. No. 7,870,387, there is also a need for authorizations that take into account the connectivity state of a computer.

SUMMARY

We disclose techniques which allow definition and enforcement of connectivity-based action and execution authorization policies. On a computer, an action or execution attempt is intercepted in real-time. The connectivity state of the computer, the subject process, the program file of the subject process, the attempted action and the object of the attempted action are determined. An authorization policy considering the connectivity state indicates whether the attempted action is authorized or not. In a tracking mode, the attempted action and its authorization are logged and the attempted action is allowed to proceed. In an enforcement mode, unauthorized attempts are blocked and logged, thereby enforcing the authorization policy.

DETAILED DESCRIPTION

In the connectivity-based authorization techniques described herein, a process' attempt to perform an action on an object is intercepted. The state of connectivity, along with other things such as the subject program, the object, and the attempted action, are then determined. By way of example, the interception and subsequent determinations can be performed by a software agent running on the computer. Referring to an authorization policy which considers the connectivity and other determined attributes, a decision is made to either allow or block the attempted action. In both cases, it may be desirable to generate a log or alert indicative of the decision.

Figure 1:
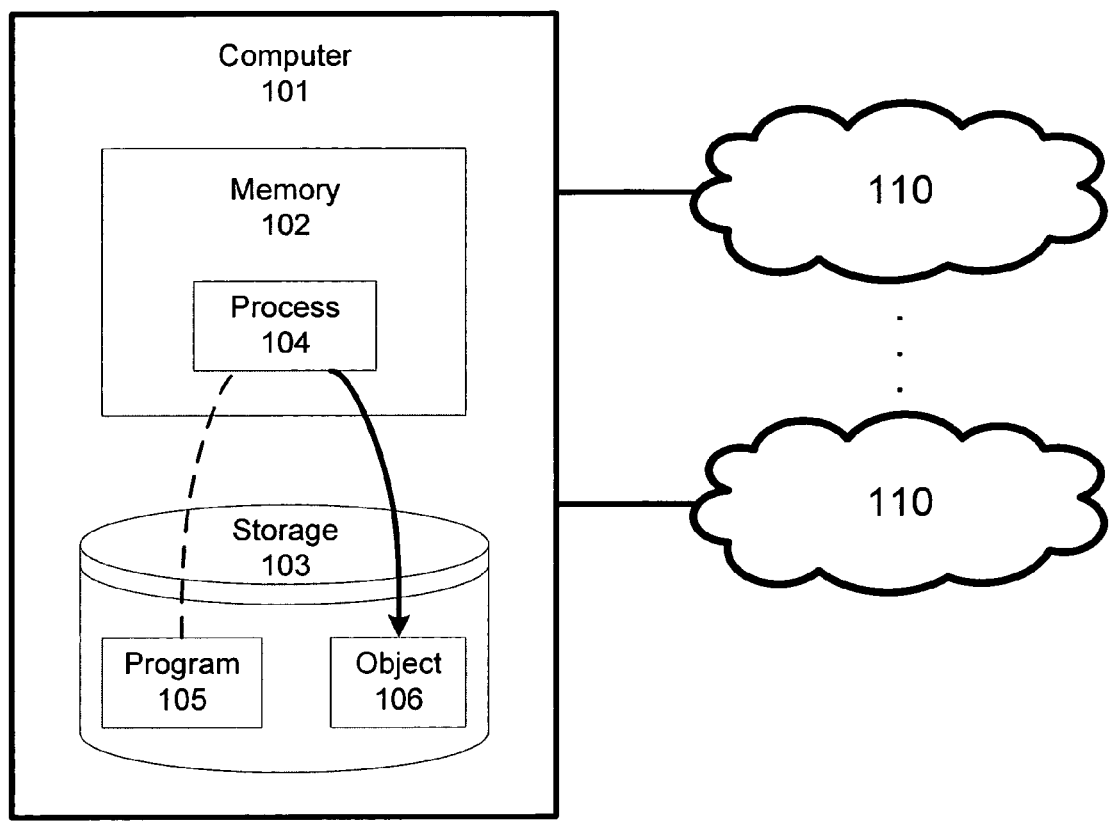
FIG. 1 is a diagrammatic illustration of an exemplary system for connectivity-based authorization, in accordance with an embodiment of the present invention.

FIG. 1 is a diagrammatic illustration of an exemplary system for connectivity-based authorization, in accordance with an embodiment of the present invention. Computer 101 comprises a memory component 102 and a storage component 103, managed by an operating system (OS). Computer 101 is connectable to one or more networks 110 over wired (such as Ethernet or ATM) or wireless links (such as 802.11).

During the operation of computer 101, processes are launched to perform various actions in accordance with the operation of computer 101. Specifically, when a process 104 (hereinafter also referred to as "subject process") is launched, it executes within memory component 102. A program file 105 (hereinafter also referred to as "subject program file") represents the code or sequence of instructions which subject process 104 starts executing upon its launch. The subject program file 105 is typically some type of an executable file, such as a binary executable file, script, batch file, interpreted code, byte code, etc. Program file 105 is stored on storage component 103 or is otherwise accessible to computer 101. Note that subject process 104, during its life, may execute other code or instructions such as dynamic libraries, scripts, accepted input, or any other container of code, but the program file 105 refers to the code that subject process 104 starts out executing upon process launch. Furthermore, as described in more detail below, when subject process 104 is launched to execute a script, the program file 105 refers to the script and not to any interpreter of the script.

At some point during its execution, subject process 104 may attempt to perform an action on an object 106. For example, object 106 may be a file and the action attempt may comprise an attempt to write to the file. Other examples of objects 106 and actions are described below.

Using techniques described herein, the action attempt of subject process 104 is intercepted and an authorization policy is consulted. The authorization policy takes into account the state of the connectivity state of computer 101, and preferably also considers one or more other parameters such as the subject process 104, the subject program file 105, the object 106, and the action being attempted by subject process 104. The authorization policy indicates whether the attempted action is authorized or not.

There are two broad modes of operation for the connectivity-based authorizations of the present invention: a "tracking mode" and an "enforcement mode". Both modes allow authorized attempts to proceed, but the modes differ in how they handle unauthorized attempts. In an enforcement mode, unauthorized attempts are blocked. In a tracking mode, unauthorized attempts are allowed to proceed, but they are logged. Tracking mode is useful for examining what effects an authorization policy would have on a system were the policy to be enforced. Tracking mode allows experimentation with and fine-tuning of authorization policies on a live computer 101, as well as real-time feedback based thereon, without disturbing the operation or behavior of the computer 101. Once an authorization policy is deemed acceptable, it can be enforced by switching from tracking mode to enforcement mode.

A typical example of an object 106 is a file, managed by a file system of computer 101. In that case the action attempt is a file system action attempt such as a read, write or delete operation on the file, or it may be an attempt to execute the file. Another example of an object 106 is a registry entry, such as one managed by a Windows™ operating system. In that case the action attempt may be a retrieve, create or delete a registry entry. Other examples of objects 106 include containers or resources managed by a service-oriented architecture (SOA), data structures or other objects stored in memory 102, or any other objects that are accessible to subject process 104. In general, the actions that can be attempted by the subject process 104 depend on the object 106 and how the object is being managed. While the following description is illustrated mainly with reference to file system action attempts, this is by way of example and is not intended to limit the scope of the disclosed techniques. It should be obvious to one of ordinary skill in the art that the disclosed techniques can be applied to connectivity-based authorization of any action attempted by a subject process on a computer. Further example actions for files and registry entries are enumerated below.

Connectivity-Based Action Authorization

Figure 2:
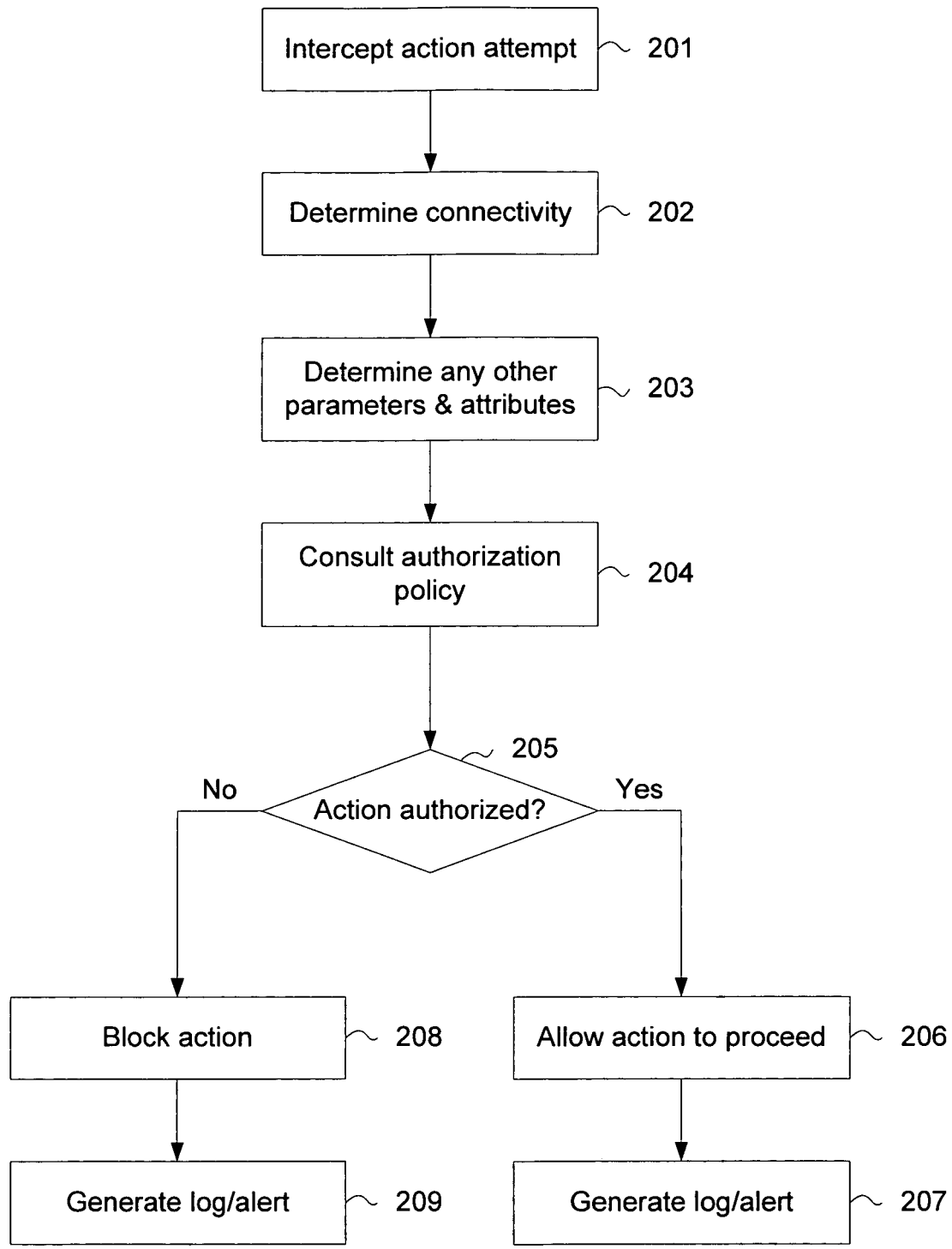
FIG. 2 is a flow diagram showing a method for connectivity-based action authorization, according to an embodiment of the present invention.

FIG. 2 is a flow diagram showing a method for connectivity-based action authorization, according to an embodiment of the present invention. Step 201 intercepts a file system action attempt. This step preferably occurs in real-time. Step 202 determines the network connectivity of computer 101.

Before consulting a connectivity-based authorization policy, step 203 preferably also determines one or more other parameters relevant to an authorization of the attempted action, such as the target file (object 106) of the file system action attempt, the subject process 104 and the subject program file 105, and the action that is being attempted by subject process 104 on object 106. Step 203 optionally also determines one or more other attributes of the above parameters, examples of which are enumerated below.

Step 204 consults an authorization policy in order to determine 205 whether the attempted action is authorized or not. The authorization policy takes into account the connectivity determined in step 202, and preferably also takes into account one or more other parameters or attributes determined in step 203. Optionally, the authorization policy may disregard some of the determined information. For example, the authorization policy may disregard some or all of the file object 106 attributes and consider only the connectivity of computer 101 and the attempted action. Authorization policies may be stored using any appropriate data structure, for example in a computer readable medium comprising a table with a plurality of entries, with an entry associating a connectivity state with one or more allowed actions and subject programs and objects on the computer.

Next, if the action is authorized, step 206 allows the action to proceed and optional step 207 generates one or more log entries and/or alerts indicating that the authorized action was allowed to proceed. If the action is not authorized, step 208 blocks the action from proceeding and optional step 209 generates one or more log entries and/or alerts indicating that the unauthorized action was blocked. A log entry or alert may include information about the connectivity, the subject process 104, the subject program 105, the action, the object 106, relevant authorization policy, date and time, and/or any other information relevant to the authorization decision and available at the time of logging. Steps 208 and 209 are for an enforcement mode embodiment of the present invention. In a tracking mode embodiment, as described above, step 208 is skipped, allowing the unauthorized action to proceed and recording logs and/or alerts at step 209.

Example attributes of the subject process 104, action and object 106 are described in the above-referenced U.S. Pat. No. 7,870,387. Example attributes of the connectivity include the following:

Network to which computer 101 is connected. A network is broadly defined as any set of nodes (such as computers, routers, switches, etc.) that can communicate with each other using some protocol. There may be more than one network to which computer 101 is connected at any given time, and such a set of connected networks may dynamically change over time as connected networks are disconnected and new connections are established.

For a network to which computer 101 is connected or connectable, attributes such as:
whether the network is wired or wireless;
a network identifier, such as a Media Access Control (MAC) address of a default gateway, or a Service Set Identifier (SSID) of a wireless network;
a connection-specific Domain Name Service (DNS) suffix;
an Internet Protocol (IP) address of the computer 101, a subnet mask, a default gateway, a Dynamic Host Configuration Protocol (DHCP) server, a DNS server, a Windows™ Internet Naming Service (WINS) server, etc.;
communication protocols supported by the network, such as IPv4, IPv6, IPX, NetBEUI, AppleTalk, etc.;

date and time of when a DHCP lease was obtained and/or when it will expire;

any associated security settings, such as no encryption, IPSec (when implemented as a "bump in stack"), Wi-Fi Protected Access (WPA), Wired Equivalent Privacy (WEP), etc.;

whether computer 101 is currently connected to a Microsoft™ Active Directory domain;

whether computer 101 is currently connected to a single sign-on network, such as one configured to use Kerberos;

network connection speed;

any DHCP options selected for the network (if DHCP enabled);

any DHCP options selected for the computer 101, for example the boot image to use for booting up the OS of computer 101;

whether a specific service (such as an anti-virus update service, an application update service, an OS update service such as Microsoft Windows™ Update, etc.) is currently available via the network;

whether a specific network node (such as an anti-virus update server, an application update server, an OS update server such as a server for Microsoft Windows™ Update, etc.) is currently available via the network;

DNS SRV records for the network (such as including those specified in RFC 2782);

We now turn to describing the steps of FIG. 2 in more detail. For the interception step 201, OS provisions can be used to intercept file system action requests and registry action requests, as well as to determine whether a file system action request is a an attempt to read a file, write to a file, delete a file, rename a file, move a file, append to a file, truncate a file, get or set permissions on a file, or get or set any other attribute of a file. For example, in a Microsoft Windows™ OS environment, a filter driver can be used to intercept file system requests and determine their type.

In other operating systems, such as Linux or other Unix-derived operating systems, a "shim" module or wrapper mechanism can be used for that purpose. A wrapper mechanism would redirect action attempts (e.g. system calls) to a wrapper library that represents an entry point for the interception code, and which may eventually call into the original library or code that implements the intended action attempt. One way of indicating redirection to the wrapper library comprises setting one or more environment variables indicating library load paths and sequences.

A shim module redirects system calls to custom interception code within the kernel, and the interception code decides whether or not to redirect execution to the kernel code that implements the system call. For example, in a Unix-derived OS, one or more virtual file system (VFS) methods may be patched to facilitate redirection to interception code. These and other techniques for the interception of file system requests should be obvious to one of ordinary skill in the art, and are also briefly described in the above referenced U.S. Pat. No. 7,757,269. Similarly, OS provisions can be used to intercept registry action requests and determine whether the request is an attempt to read or retrieve an entry, delete an entry, write to an entry, create an entry, or perform any other actions on the entry. We continue to illustrate the steps with exemplary references to file system requests.

Once a file system request is intercepted, the request indicates the file object 106 as well as the action that the subject process 104 is attempting to perform on the file object 106. In an embodiment where step 203 further determines the subject process 104 and its subject program file 105, one technique is to start with a unique identifier for the process context of the currently executing subject process 104. This identifier need not necessarily comprise the traditional process identification number (PID) assigned to processes by many operating systems, though it may. For example, in a Microsoft Windows™ OS, an EPROCESS block or a process handle can be used to uniquely identify the subject process 104.

Once an identifier for the subject process 104 is determined, the subject program file 105 and optionally one or more other attributes of the subject process 104 can be determined as well. For some operating systems, such as a Microsoft Windows™ OS, this information may not be available via a published application programming interface (API). In such cases, one technique for inferring the subject program file 105 associated with the subject process 104 is to explicitly keep track of the process-program associations so that they can be referred to when needed. One way to do this is by implementing a "Process Tracking Framework" abstraction which, upon receiving an identifier of a subject process 104 context, indicates the subject program file 105 associated with the subject process 104. The Process Tracking Framework is described in the above-referenced U.S. Pat. No. 7,870,387.

The authorization rules can be arbitrarily complex and may represent any function or Boolean predicate which effectively takes as input a connectivity state, a subject program file 105 of a subject process 104 (and optionally one or more further attributes of the subject process 104), a requested action, and an object 106 (or one or more file object 106 attributes), and outputs an authorization decision. We will now present some specific use cases enabled by the connectivity-based authorization techniques and authorization policies described herein.

One particular example of using connectivity-based action authorization is to implement file read restrictions on a computer. As one example of a read restriction policy, a set of authorization rules can be defined to block file transfer programs resident on computer 101 from accessing a specified set of files R whenever computer 101 has connectivity to any network other than a specific network N. For example, R may represent a set of sensitive files related to a business' operations which should be safeguarded against leaking outside of N. Consequently, as a result of enforcing the connectivity-based authorization with such a read restriction policy, whenever a file transfer program attempts to access a file in R while computer 101 is connected to any network other than N, the attempt will fail.

Another example of using connectivity-based action authorization is to implement file write restrictions on a computer. As one example of a write restriction policy, a set of authorization rules can be defined to restrict a specific program file 105 P's ability to write to the computer's 101 storage 103 depending on the computer's 101 connectivity. For example, P may be specified as a specific hypertext markup language (HTML) browser such as Microsoft Internet Explorer™, and an authorization policy can be defined which restricts P to writing only a restricted set of files whenever computer 101 is suspected to be connected to a potentially unsafe network. For example, Microsoft Internet Explorer™ may be allowed to write any type of file to computer's 101 storage 103 except executable files, scripts, batch files, and dynamic libraries, unless computer 101 is connected to a specific firewalled network N (and to no other potentially unsafe network). Furthermore, Microsoft Internet Explorer™ may be also restricted from modifying existing content on storage 103 unless a connection to N (and no connection to any other network) can be detected. This means that whenever a connection to the firewalled network cannot be detected, Microsoft Internet Explorer™ will be blocked from writing such restricted files to the computer's 101 storage 103 or modifying existing content, thereby reducing the risk of browser-written malware and malicious changes to computer 101.

Other examples of using connectivity-based action authorization comprise extending the concepts disclosed in above-referenced U.S. Patents and co-pending U.S. Patent Applications with the connectivity-based authorization techniques disclosed herein. In particular, U.S. Pat. Nos. 7,757,269 and 7,895,573 describe techniques involving authorization of updates, changes and executions of objects resident on a computer system (such as software, configuration files, registry entries, executables, etc.). The present connectivity-based authorization techniques extend the authorization of updates, changes and executions described in said patents to also take into account the connectivity of the computer 101.

Connectivity-Based Execution Authorization

The process for execution authorization is similar to that for action authorization, except that in some operating systems execution requests may follow a different code path than other file system action requests, and therefore the interception of execution requests may differ in implementation from the interception of other file system action requests.

Figure 3:
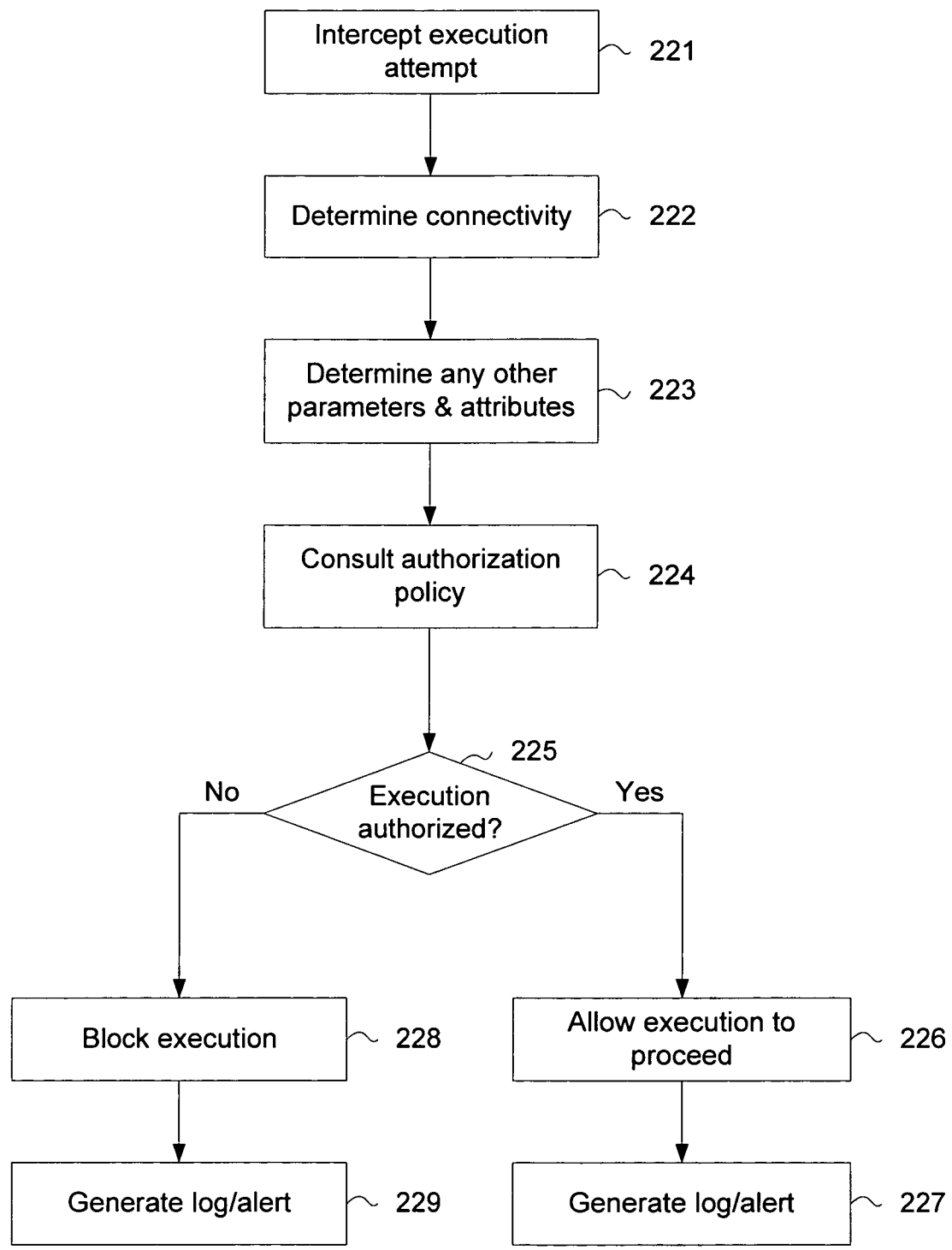
FIG. 3 is a flow diagram showing a method for connectivity-based execution authorization, according to an embodiment of the present invention.

FIG. 3 is a flow diagram showing a method for connectivity-based execution authorization, according to an embodiment of the present invention. Step 221 intercepts an execution attempt. This step preferably occurs in real-time. Step 222 determines the network connectivity of computer 101.

Before consulting a connectivity-based authorization policy and analogously to step 203 above, step 223 preferably also determines one or more other parameters relevant to an authorization of the attempted execution, such as the target executable file (object 106) of the execution attempt, the subject process 104 that is attempting to execute the executable file (object 106), and the subject program file 105 that represents the code being executed by the subject process 104. Optionally, step 223 also determines one or more other attributes of the above parameters, as was enumerated above. For example attributes of the executable file, refer to the above described object 106 attributes.

Step 224 consults an authorization policy to determine 225 whether the attempted execution is authorized or not. The authorization takes into account the connectivity determined in step 222, and preferably also takes into account any other parameters and attributes as determined in step 223. Optionally, the authorization policy may disregard some of the determined information. For example, the authorization policy may disregard some or all of the executable file (object 106) attributes and consider only the connectivity and the subject program file 105. For example, specific programs may be prohibited from executing unless computer 101 is connected only to a trusted network. As a concrete example for a specific business organization, browsers (such as Microsoft Internet Explorer™) and tools which process proprietary or sensitive data (such as computer-aided design (CAD) tools) may be prohibited from running unless computer 101 is connected to the organization's one or more trusted network. As described above, authorization policies may be stored using any appropriate data structure, for example in a computer readable medium comprising a table with a plurality of entries, with an entry associating a connectivity state with one or more allowed executions and subject programs and objects on the computer.

If the execution is authorized, step 226 allows the execution to proceed and optional step 227 generates one or more log entries and/or alerts indicating that the authorized execution was allowed to proceed. If the execution is not authorized, step 228 blocks the action from proceeding and optional step 229 generates one or more log entries and/or alerts indicating that an unauthorized execution was blocked. Analogous to the above description, steps 228 and 229 are for an enforcement mode embodiment of the present invention. In a tracking mode embodiment, step 228 is skipped, allowing the unauthorized execution to proceed and recoding logs and/or alerts at step 229.

We now turn to describing the steps of FIG. 3 in more detail. One technique for implementing the interception step 221 comprises placing hooks within the process creation and process termination code paths of the OS. This is also described in the above-referenced U.S. Pat. No. 7,870,387. For step 222, the determination of connectivity proceeds as described for step 202 above. For step 223, since an execution request submitted to the OS generally includes an indication of the executable file (object 106) as an argument (e.g. name or handle of a binary file, script file, batch file, interpreted program file, byte code file, etc.), the executable file can be determined by examining the execution request intercepted in step 221. Any other parameters and attributes for step 223 can be determined as described above for step 203. Determination of the subject process (step 223*a*) can be done as described above, for example by starting with a unique identifier for the process context of the currently executing subject process 104. Determination of subject process 104 attributes (step 223*b*), such as the actual program file comprising the code for the subject process, can be done by using the Process Tracking Framework described in the above-referenced U.S. Pat. No. 7,870,387.

The disclosed connectivity-based authorization techniques generalize to any other objects and actions which are accessible to running processes. Examples of such other objects include: synchronization objects such as semaphores and locks; inter-process communication (IPC) objects such as shared memory segments; communication objects such as network sockets; local communication abstractions such as pipes; file access objects such as symbolic links (on a Unix-flavored OS) and shortcuts (on a Windows™ OS); running processes; etc. Actions applicable to such objects depend on the specific abstractions, implementations and semantics of the systems managing the objects, with examples including: killing, suspending, unsuspending or sending signals to processes; acquiring or releasing locks; reading from or writing to shared memory segments; opening, reading from, writing to, or closing network sockets or pipes; etc. The adaptation of the program-based authorization steps disclosed herein to such objects and actions (such as interception of action attempts, determination of object attributes, etc.) should be obvious to one of ordinary skill in the art.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method of authorizing a file system action on a computer, the method steps comprising:
    intercepting a file system action attempt indicating an action by a process on an object;
    determining an identifier for the process;
    using the identifier to determine a program file representing instructions being executed by the process;
    determining a network connectivity state of the computer, wherein at least one entry in an authorization policy designates an authorization of a particular action for the program file based on the network connectivity state and a type of action associated with the particular action, and wherein a network connectivity state parameter includes an attribute associated with whether the computer is connected to a wired network or a wireless network;
    determining whether the action is authorized or not based on the authorization policy, wherein the authorization policy includes the network connectivity state parameter, a program file parameter, an object parameter, and an attempted action parameter;
    allowing the action by the process to proceed when the action is authorized, as indicated by the authorization policy; and
    responding when a determination is made that the action is not authorized, wherein said responding comprises a first mode and a second mode, when in the first mode the action is blocked and an alert is generated, the alert including the type of action and the network connectivity state at the time the action was attempted, and when in the second mode the action is allowed to proceed and an alert is generated.

2. A method as recited in claim 1, wherein the determining further determines one or more attributes of the process or of the program file.

3. A method as recited in claim 1, wherein the action indicates a read operation on the object.

4. A method as recited in claim 1, wherein the action indicates a write, append or truncate operation on the object.

5. A method as recited in claim 1, wherein the action indicates a delete, move or rename operation on the object.

6. A computer-implemented method for authorizing registry actions on a computer that includes a processor and a non-transitory computer readable medium, comprising:
    intercepting a registry action attempt indicating an action by a process on a registry entry;
    determining an identifier for the process;
    using the identifier to determine a program file representing instructions being executed by the process;
    determining a network connectivity state of a computer, wherein at least one entry in an authorization policy designates an authorization of a particular action for the program file based on the network connectivity state and a type of action associated with the particular action, and wherein a network connectivity state parameter includes an attribute associated with whether the computer is connected to a wired network or a wireless network;
    determining whether the action is authorized or not based on the authorization policy, wherein the authorization policy includes the network connectivity state parameter, a program file parameter, an object parameter, and an attempted action parameter;
    allowing the action by the process to proceed when the action is authorized, as indicated by the authorization policy; and
    responding when a determination is made that the action is not authorized, wherein said responding comprises a first mode and a second mode, when in the first mode the action is blocked and an alert is generated, the alert including the type of action and the network connectivity state at the time the action was attempted, and when in the second mode the action is allowed to proceed and an alert is generated.

7. A method as recited in claim 6, wherein the determining further determines one or more attributes of the processor of the program file.

8. A method as recited in claim 6, wherein the action indicates a read, retrieve, write, create or delete operation on the registry entry.

9. A method for authorizing executions on a computer that includes a processor and a non-transitory computer readable medium, comprising:
    intercepting an execution attempt indicating a process attempting to execute an executable file;
    determining an identifier for the process;
    using the identifier to determine a program file representing instructions being executed by the process;
    determining a network connectivity state of the computer, wherein at least one entry in an authorization policy designates an authorization of a particular execution for the program file based on the network connectivity state and a type of execution associated with the particular execution, and wherein a network connectivity state parameter includes an attribute associated with whether the computer is connected to a wired network or a wireless network;
    determining whether the execution is authorized or not based on the authorization policy, wherein the authorization policy includes the network connectivity state parameter, a program file parameter, an object parameter, and an attempted execution parameter;
    allowing the execution to proceed when the execution is authorized, as indicated by the authorization policy; and
    responding when a determination is made that the execution is not authorized, wherein said responding comprises a first mode and a second mode, when in the first mode the execution is blocked and an alert is generated, the alert including the type of action and the network connectivity state at the time the execution was attempted, and when in the second mode the execution is allowed to proceed and an alert is generated.

10. A method as recited in claim 9, wherein the determining further determines one or more attributes of the process or of the program file.

11. At least one non-transitory computer readable medium having instructions stored thereon, the instructions when executed by a processor cause the processor to:
    intercept a file system action attempt indicating an action by a process on an object;
    determine an identifier for the process;
    use the identifier to determine a program file representing instructions being executed by the process;
    determine a network connectivity state of the computer, wherein at least one entry in an authorization policy designates an authorization of a particular action for the program file based on the network connectivity state and a type of action associated with the particular action, and wherein a network connectivity state parameter includes an attribute associated with whether the computer is connected to a wired network or a wireless network;
    determine whether the action is authorized or not based on the authorization policy, wherein the authorization policy includes the network connectivity state parameter, a program file parameter, an object parameter, and an attempted action parameter;

allow the action by the process to proceed when the action is authorized, as indicated by the authorization policy; and respond when a determination is made that the action is not authorized, wherein a response comprises one of a first mode and a second mode, when in the first mode the action is blocked and an alert is generated, the alert including the type of action and the network connectivity state at the time the action was attempted, and when in the second mode the action is allowed to proceed and an alert is generated.

12. At least one non-transitory computer readable medium having instructions stored thereon, the instructions when executed by a processor cause the processor to:

intercept a registry action attempt indicating an action by a process on a registry entry;

determine an identifier for the process;

use the identifier to determine a program file representing instructions being executed by the process;

determine a network connectivity state of a computer, wherein at least one entry in an authorization policy designates an authorization of a particular action for the program file based on the network connectivity state and a type of action associated with the particular action, and wherein a network connectivity state parameter includes an attribute associated with whether the computer is connected to a wired network or a wireless network;

determine whether the action is authorized or not based on the authorization policy, wherein the authorization policy includes the network connectivity state parameter, a program file parameter, an object parameter, and an attempted action parameter;

allow the action by the process to proceed when the action is authorized, as indicated by the authorization policy; and respond when a determination is made that the action is not authorized, wherein a response comprises one of a first mode and a second mode, when in the first mode the action is blocked and an alert is generated, the alert including the type of action and the network connectivity state at the time the action was attempted, and when in the second mode the action is allowed to proceed and an alert is generated.

13. At least one non-transitory computer readable medium having instructions stored thereon, the instructions when executed by a processor cause the processor to:

intercept an execution attempt indicating a process attempting to execute an executable file;

determine an identifier for the process;

use the identifier to determine a program file representing instructions being executed by the process;

determine a network connectivity state of the computer, wherein at least one entry in an authorization policy designates an authorization of a particular execution for the program file based on the network connectivity state and a type of execution associated with the particular execution, and wherein a network connectivity state parameter includes an attribute associated with whether the computer is connected to a wired network or a wireless network;

determine whether the execution is authorized or not based on the authorization policy, wherein the authorization policy includes the network connectivity state parameter, a program file parameter, an object parameter, and an attempted execution parameter;

allow the execution to proceed when the execution is authorized, as indicated by the authorization policy; and respond when a determination is made that the execution is not authorized, wherein a response comprises one of a first mode and a second mode, when in the first mode the execution is blocked and an alert is generated, the alert including the type of action and the network connectivity state at the time the execution was attempted, and when in the second mode the execution is allowed to proceed and an alert is generated.

* * * * *